United States Patent [19]

Guarnieri

[11] 4,186,761
[45] Feb. 5, 1980

[54] QUICK-RELEASE SYSTEM FOR MOUNTING A FAUCET ASSEMBLY

[76] Inventor: Carmine Guarnieri, P.O. Box 373, Fairfield, Conn. 06430

[21] Appl. No.: 906,258

[22] Filed: May 15, 1978

[51] Int. Cl.² ............................................. F16L 5/00
[52] U.S. Cl. ...................................... 137/315; 4/192; 137/327; 137/359
[58] Field of Search .................... 4/191, 192; 137/315, 137/327, 359

[56] References Cited

U.S. PATENT DOCUMENTS

| 231,283 | 8/1880 | Cushing | 251/309 |
|---|---|---|---|
| 322,318 | 7/1885 | Polle | 251/310 X |
| 1,628,337 | 5/1927 | Shogran | 137/359 X |
| 1,704,851 | 3/1929 | Zolleis | 137/359 |
| 3,190,308 | 6/1965 | Winkle et al. | 137/359 |
| 3,782,417 | 1/1974 | Moen | 137/359 X |

*Primary Examiner*—Gerald A. Michalsky
*Attorney, Agent, or Firm*—St. Onge, Steward, Johnston, Reens & Noe

[57] ABSTRACT

A quick-release system is disclosed for mounting a faucet assembly that includes a valve positionable on and operable from one side of a wall structure which is connected to a source of fluid on the other side of the wall structure through an opening therein. The quick-release system comprises an escutcheon, mounted in fixed relation with the valve on one side of the wall structure, that is configured to prevent its passage through the opening and an elongate, substantially inextensible stem mounted in fixed relation with the valve and the escutcheon that provides fluid communication between the valve and the fluid source. The stem is configured to extend through the opening with its free end spaced from the other side of the wall structure and is formed with at least one groove intermediate the free end and this other side. A washer, received in loose coaxial relation about the stem, is matable with the surface of the other side of the wall structure adjacent the opening and a helical coil spring, also receivable in loose coaxial relation about the stem, has an axial dimension in its relaxed condition that is greater than the distance from the groove to the other side of the wall structure. A generally U-shaped spring retainer clip is sized to be removably received in the groove and thereby defines a reaction surface that projects perpendicularly from the axis of the stem. The spring may be compressed between the reaction surface and the washer to thereby confine the wall structure between the escutcheon and washer and firmly hold the valve in its operable position.

18 Claims, 4 Drawing Figures

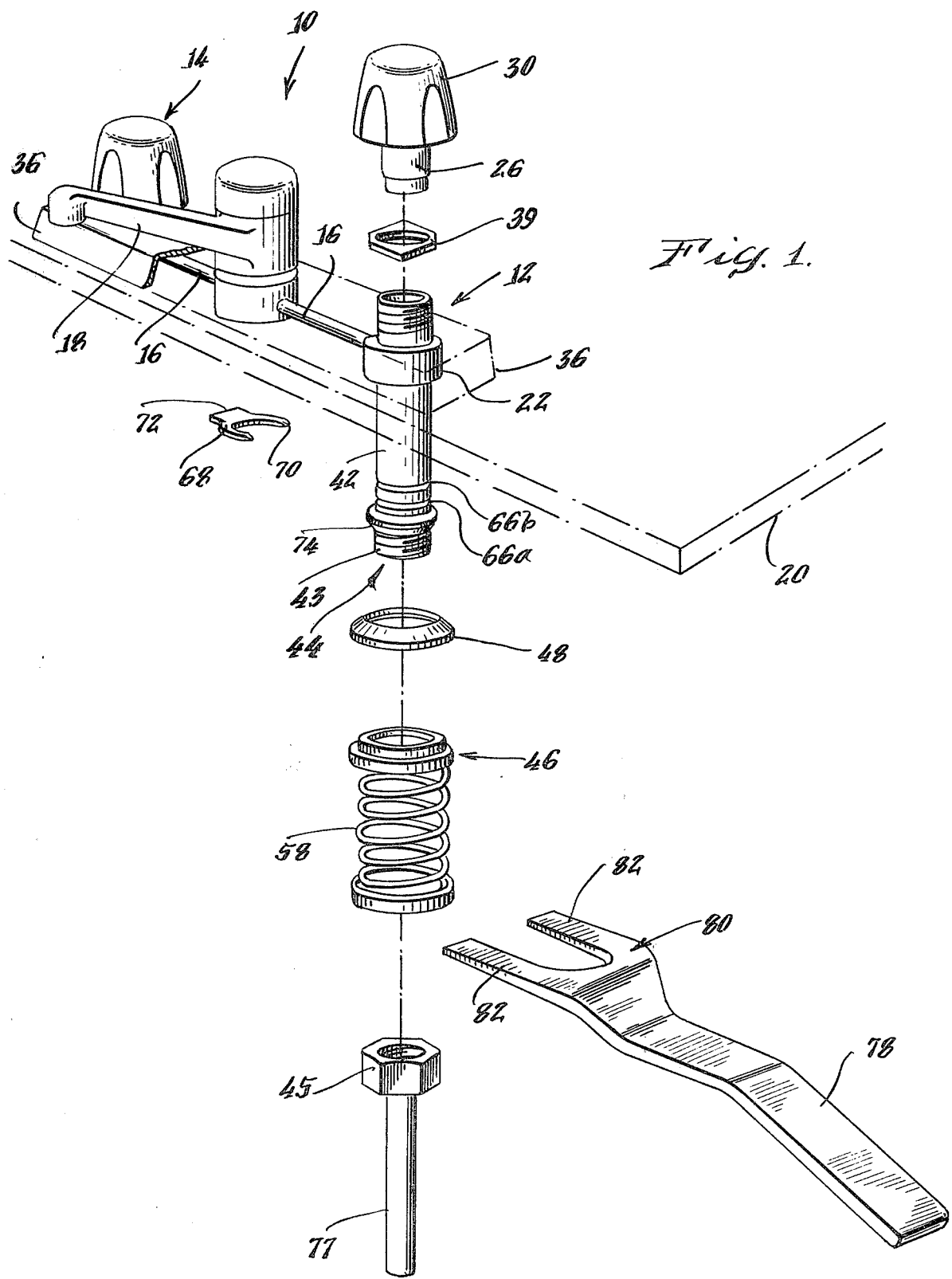

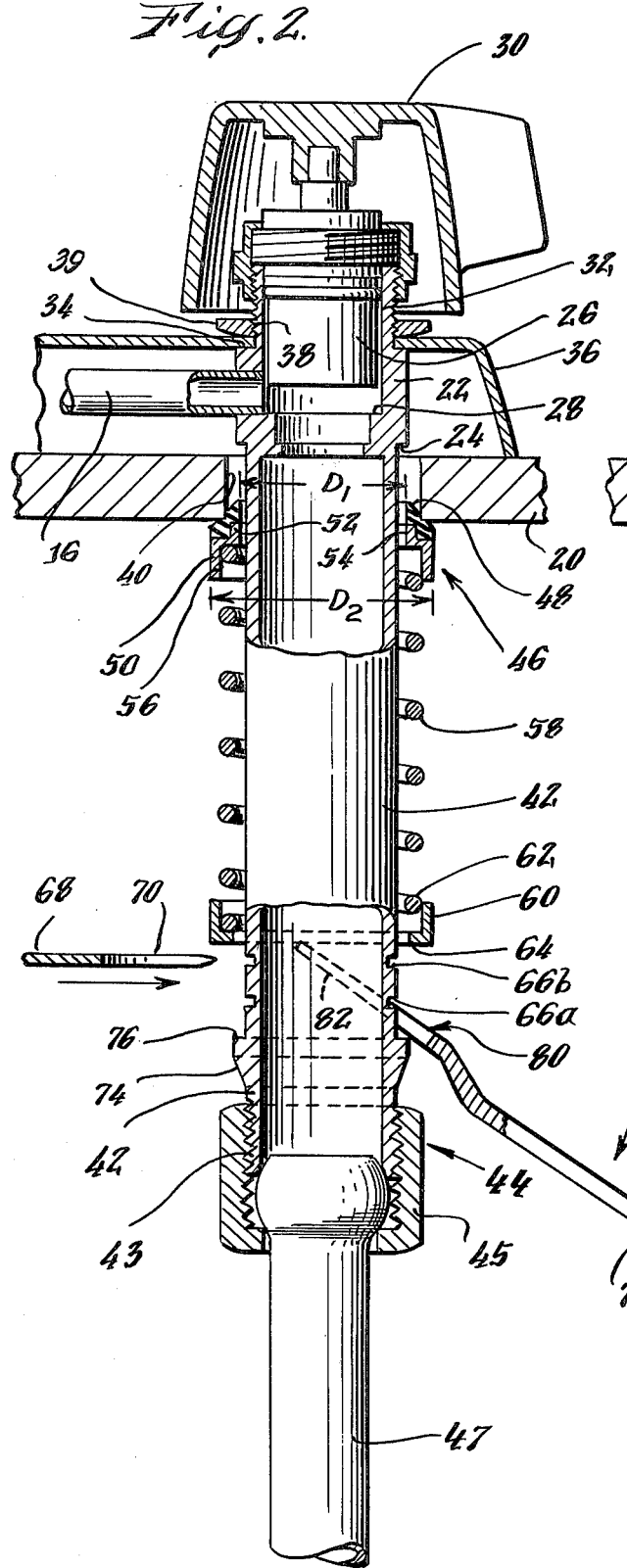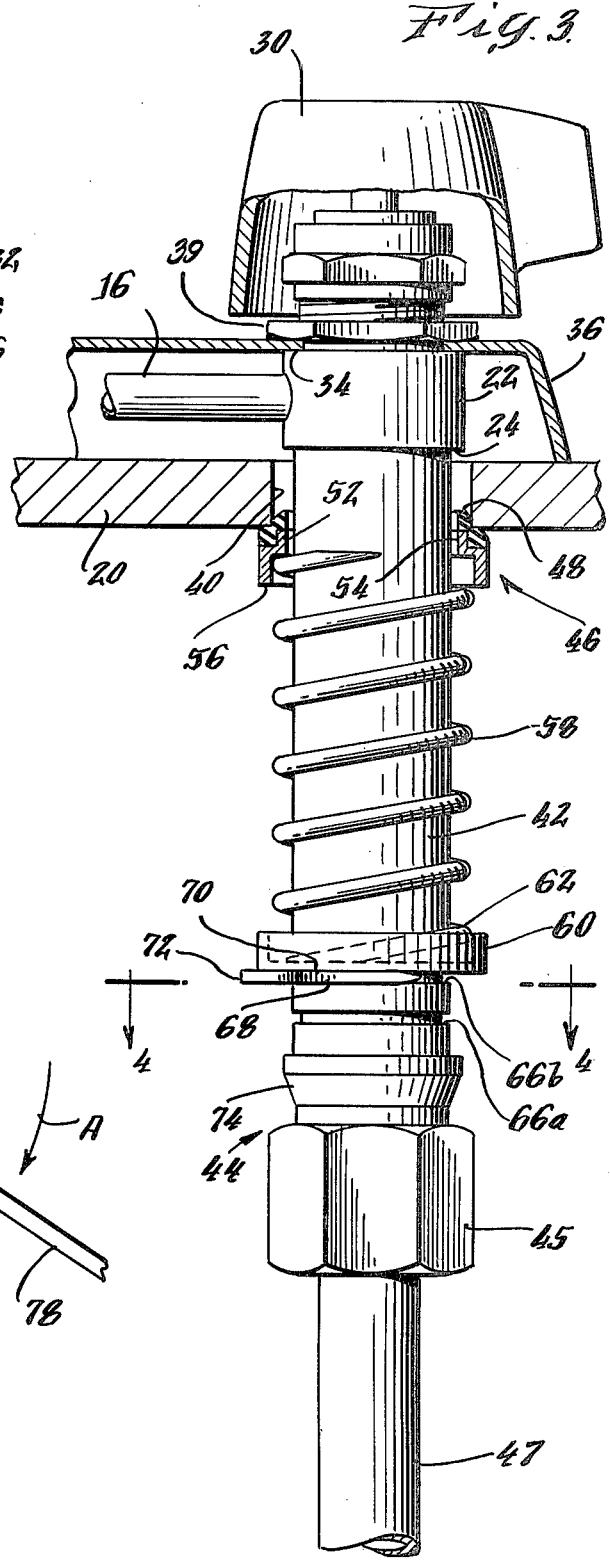

QUICK-RELEASE SYSTEM FOR MOUNTING A FAUCET ASSEMBLY

BACKGROUND OF THE INVENTION

1. Field of the Invention

The present invention relates to a quick-release system for removably and firmly holding a valve forming part of a faucet assembly in its operable position on one side of a wall structure such as a kitchen or bathroom counter. However, the system of the invention may also be used with equal advantage in other applications in which a valve is secured to a wall structure from the opposite side thereof, access to which is limited because of other equipment mounted on the wall structure or because of the valve location in a structure. However, for convenience the present invention is described in the environment of a kitchen faucet mounted on a kitchen counter.

Typically, kitchen faucet assemblies comprise two valves, one for hot water and the other for cold water, that are mounted on and accessible from the top of a kitchen counter. Both valves control the flow of water to an outlet spout that is positioned to dispense water into a sink.

Each valve is mounted with a stem that projects through an opening in the counter and is threaded to receive a complementary nut that, when tightened against the surface of the underside of the counter, pulls the valve and assembly into firm engagement with the top thereof. However, the sink is also typically recessed a substantial distance below the underside of the counter and the faucet assembly is usually mounted adjacent a wall. Therefore, a bolt threaded on the valve stem must be manipulated in a relatively narrow space defined between the outer surface of the recessed sink and the adjacent wall. The stem and nut when in this space must also be difficult to see. This manipulation often requires special tools and even when an installer has access to them, the job can be difficult.

The quick-release system of the present invention is intended to ease installation of faucet assemblies which are constructed in the manner described above.

2. Description of the Prior Art

Household faucet assemblies are commonly constructed in the manner described above. However, proposals have been made to mount various components of such faucet assemblies in other manners. For example, U.S. Pat. Nos. 1,704,851 (Zolleis) and 3,190,308 (Winkle et al.) both disclose devices for mounting escutcheons in such faucet assemblies that use coil springs compressed between some fixed point on a structure projecting from the surface of a wall or counter to hold something against that same surface. The valve fixture disclosed in the Zolleis Patent, for example, includes a valve casing that projects through a wall and includes a valve stem on which a handle for actuating the valve is mounted. A spring is compressed between the base of the handle and an inner surface of an escutcheon. The reaction of the compressed spring forces the escutcheon against the front surface of the wall. The Winkle Patent discloses a similar construction having a spring that is compressed between an annulus mounted inside the end of a spout body that is threaded on an end portion of a pipe. The spring is further compressed against the base of a cover housing to hold the housing against the front surface of a wall. Neither of these patents discloses a quick-release system for mounting a faucet assembly from an opposite side of the wall.

U.S. Pat. No. 1,628,337 (Shogran) discloses a gas control valve that includes a gas cock which has an outer conical surface and is received in a plug having a complementary conical cavity. Movement of the gas cock into the plug is limited by the interengaging conical surfaces. A spring is compressed behind and against the back wall of the plug and reacts against a pin which is inserted into a portion of the gas cock that extends from this back wall. Apparatus for assembling this valve is not disclosed.

Other patents which relate to various aspects of faucet or valve construction include U.S. Pat. Nos. 1,436,027 (Ferris), 2,608,378 (Hinderer), 2,708,449 (Keithley), 3,376,888 (Anthony) and 3,807,453 (Don et al.).

SUMMARY OF THE INVENTION

The quick-release system of the present invention is designed to overcome difficulties frequently encountered in the past in installing a faucet assembly and in demounting the assembly for repair or replacement. This system is particularly well suited for installing faucets on counters where access to faucet assembly components beneath the counter is limited. Further, the system is designed to permit maximum flexibility in installing faucet assemblies in many locations regardless of the thickness of the counter or wall structure on which the assembly is mounted.

In a preferred embodiment, the quick-release system of the present invention firmly holds a valve in its operable position on one side of a wall structure such as a kitchen or bathroom counter. The valve is connected to a source of fluid on the other side of the counter through an opening therein. The system of the invention comprises an escutcheon, mounted in fixed relation with the valve on the one side of the counter, that is configured to prevent its passage through the opening. An elongate substantially inextensible stem is mounted at one end in fixed relation with the valve and the escutcheon and provides fluid communication between the valve and the fluid source. The stem is configured to extend through the opening with its free end spaced from the other side of the wall structure and is further formed with at least one annular groove immediate the free end and this other side. A washer, which is receivable in loose coaxial relation about the stem, is matable with the surface of the other side of the wall structure adjacent the opening and a helical coil spring, also receivable in loose coaxial relation about the stem, has an axial dimension in its relaxed condition greater than the distance from the groove to the other side of the wall structure. A generally U-shaped retainer clip is sized to be removably received in the groove and thereby defines a reaction surface projecting perpendicularly from the axis of the stem. Accordingly, the spring may be compressed between the reaction surface of the clip and the washer to confine the wall structure between the escutcheon and the washer and firmly hold the valve in its operable position.

The stem is also formed with a platform intermediate the groove and the free end thereof which defines a shoulder extending radially from the axis of the stem and facing the valve and escutcheon. A spring lifter tool is supportable on the shoulder surface to compress the spring against the washer sufficiently to permit insertion of the retainer clip in the groove.

The quick-release system of the present invention isolates the area where actual operation on its components takes place from the immediate undersurface of the wall structure. Therefore, the small working area often defined by a rear vertical wall and the side of a sink in which a faucet assembly is installed need not be an impediment to easy installation or demounting of the faucet assembly for repair or replacement.

Accordingly, it is an object of the present invention to provide a quick-release system for firmly holding a valve in a faucet assembly in its operable position that eases installation as well as demounting of the assembly for repair or replacement. It is a further object of the invention to eliminate the need for threading a bolt on a faucet stem into engagement with the other side of a wall structure to firmly mount a faucet assembly. These advances in ease of installation of such a faucet assembly greatly reduce installation or repair time and hence cost.

Other objects, features or advantages of the invention will be pointed out in or will be understood from the following detailed description provided below in conjunction with the accompanying drawings.

BRIEF DESCRIPTION OF THE DRAWINGS

FIG. 1 is an exploded perspective view of the various components of the quick-release system of the present invention for mounting the valve of a faucet assembly in firm engagement with one surface of a wall structure.

FIG. 2 is a vertical cross-sectional view of the quick-release system shown in FIG. 1 illustrating how the helical coil spring may be compressed by a spring lifter tool to permit insertion of the retainer clip in appropriate groove.

FIG. 3 is a vertical cross-sectional view similar to that shown in FIG. 2 with all components of the system in their assembled positions.

DETAILED DESCRIPTION OF THE PREFERRED EMBODIMENT

Figure 4:
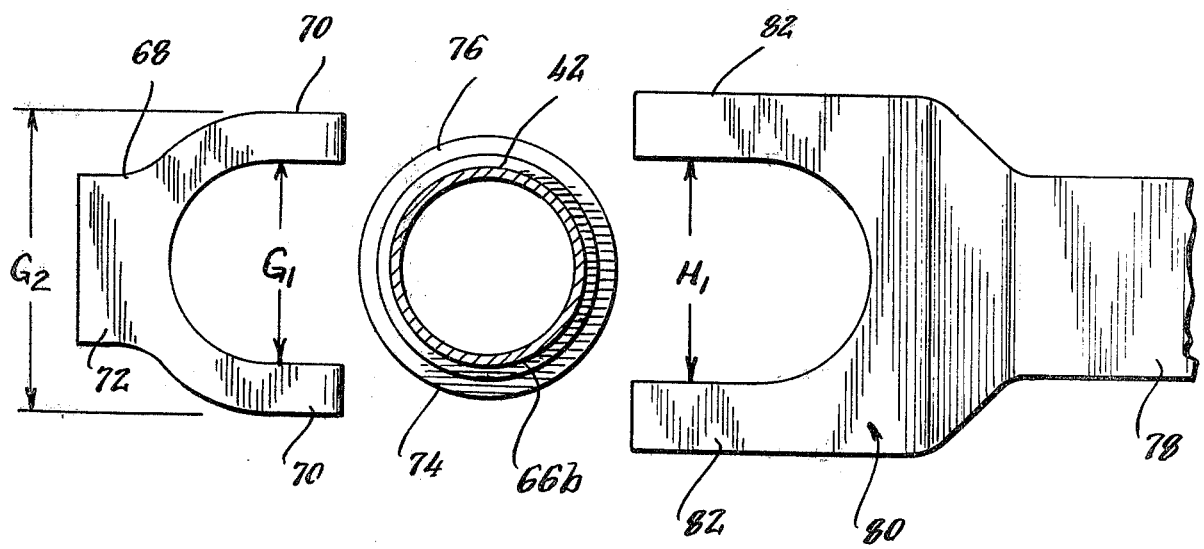
FIG. 4 is a vertical cross-sectional view taken through Plane 4—4 of FIG. 3 showing the relative dimensions of the stem, groove and platform, and the retainer clip and spring lifter tool

FIG. 1 illustrates the various components of the faucet assembly system of the present invention as it may be adapted to install a faucet assembly 10 that comprises two valves, one 12 for cold water and the other 14 for hot, both of which communicate by horizontally arranged copper tubes 16 with a pivotable outlet spout 18. The faucet assembly 10 is installed on a wall structure in the form of a bathroom or kitchen counter 20 that also mounts a sink (not shown) into which water may be dispensed from the spout 18. As noted, the faucet is usually installed between an outer surface of the sink and a vertically arranged wall (not shown) which makes it difficult to firmly mount the faucet assembly in its operable position because of the confined working areas of the underside of the counter. However, it will be understood that the quick-release system of the present invention may also be adapted to other applications where it is necessary to mount a valve on one side of a surface.

As shown in detail in FIGS. 2 and 3, each valve of the faucet assembly comprises a valve body 22 formed with a downwardly facing shoulder 24. A valve member 26 is mounted for selective movement toward and away from a valve seat 28 to control the flow of water to the copper tube 16. Usually, the valve member 26 is threaded into the valve body to be screwed toward and away from the valve seat by means of a suitable handle 30.

At its upper end 32, the valve body is threaded to a shoulder 34 which faces upwardly and complements the downwardly facing shoulder 24. A cover plate or escutcheon 36, which may also serve a decorative purpose, is provided with an opening 38 which receives the upper end 32 of the valve body. A thin clamp nut 39 is threaded onto the upper end 32 to tightly hold the upper surface of the escutcheon 36 against the shoulder 34.

The counter 20 is formed with an opening 40 and the valve is further formed or otherwise mounted with a valve stem 42 which is configured to project through the opening 40. However, the escutcheon 36 is configured to abut the upper surface of the counter and prevent passage through the opening.

It will be appreciated that means for preventing passage of the valve through the opening in the counter other than those described in detail above may be employed. Accordingly, for the purposes of this specification and the concluding claims, the term "escutcheon" is intended to mean any configuration or component of the valve assembly which prevents the valve from passing through an opening in the counter.

The free end 44 of the stem is threaded on its outer surface at 43 to receive a clamping nut 45 that holds and seals a water supply pipe 47 in fluid communication with the stem.

The faucet assembly thus far described above is conventional. In accordance with the present invention, however, the stem 42 is elongate so that its free end 44 projects to a location a substantial distance from the bottom surface of the counter 20. Preferably, the free end of the stem 42 is located below the outside bottom surface of the sink mounted adjacent the faucet assembly. Therefore, as will be described in greater detail hereinafter, necessary operations performed to install or demount the faucet assembly from the counter are performed in the region of this free end, spaced from the confined areas defined between the outside surface of the sink and a vertical wall.

The quick-release system of the invention further comprises a rubber or other resilient material washer generally indicated at 46 having a frusto-conical outside surface 48.

The washer 46 is loosely received in coaxial relation about the stem 42 as is a top support cap 50 which supports the washer in engagement with the lower surface of the counter 20. As can be seen in FIGS. 2 and 3, the top cap defines an annular rabbet 52 which mates with a similar annular rabbet 54 formed on the lower surface of the washer 46 to provide firm support therefor. Moreover, the minimum diameter $D_1$ of this frusto-conical surface 48 is smaller than the diameter of the opening 40 in the counter. However, the maximum diameter $D_2$ of the surface 48 is greater than the diameter of the counter. Therefore, at least a portion of the washer abuts the bottom surface of the counter immediately adjacent the opening 40. Further, the frusto-conical upper surface of the washer causes it to center in the opening to be substantially coaxial therewith.

The top support cap 50 is fixed to the uppermost coil 56 of a helical coil spring 58 which is also received in loose coaxial relation about the stem 42. A bottom cap 60 is fixed to the lowermost coil 62 of the spring and presents a smooth downwardly facing surface 64 through which the spring may be supported in compressed condition.

In the region of its free end 44, the stem 42 is formed with a plurality of annular grooves 66 which are spaced axially on the outer stem surface. In its relaxed condition, the spring 58 has an axial dimension greater than the distance between the lowermost groove 66a and the bottom surface of the counter 20. As shown in FIGS. 2 and 3, each groove is adapted to receive a generally U-shaped retainer clip 68 which has an inside diamension $G_1$ equal to the diameter of the inner surface of each groove 68 (FIG. 4). However, the outside dimension $G_2$ of the clip is greater than the outside diameter of the stem 42 so that when received in a groove, the retainer clip defines an upwardly facing reaction surface 70. The retainer clip 68 is also formed with a sidewardly extending tap 72 which may be gripped by an installer's fingers or by a pliers to ease insertion or removal of the clip from one of the grooves 66. Further, it will be appreciated that the clip 68 may be designed to grip the stem in the groove to resist relative disengagement of the tube.

As shown in FIG. 3, in the installed position of the various components described above, the spring is pressed between the upwardly facing reaction surface of the retainer clip and the lower surface of the washer to tightly clamp the counter between the washer and the escutcheon. This assembly results from reaction of the spring between the washer and retaining clip to pull the stem downwardly and hence the escutcheon into firm contact with the upper surface of the counter. Therefore, the spring and retaining clip serve the function of previously used bolts to firmly mount the escutcheon and hence the valve which is fixed thereto in its operable position.

Referring again to FIG. 2, the stem is further formed with a platform structure 74 intermediate its free end 44 and the lowermost groove 66a. The spring 58, washer 48 and top and bottom caps 50 and 60 all have sufficiently large inside diameters to pass over this platform. This platform structure defines an upwardly facing shoulder surface 76 which projects perpendicularly from the axis of the stem. A spring lifter tool or lever 78 is designed to be operated in cooperation with the shoulder surface 76 to lift or compress the spring 58 to a condition in which the retainer clip may be inserted into an appropriate groove. This spring lifter tool is formed with a bifurcated end 80 having two tines 82 that are separated by a distance $H_1$ greater than the outside diameter of the stem but less than the diameter of the shoulder surface 76. Accordingly, as can be seen in FIG. 2, the spring lifter tool may be wedged between the shoulder surface 76 of the platform structure 74 and the bottom cap 60. The tool is then pivoted downwardly as shown by arrow A to act as a lever bearing upwardly against the surface 64 of the bottom cap 60. When the surface 64 is elevated to a position above a groove, the retainer clip may be inserted therein. The tool may then be released to permit the spring to expand into contact with the reaction surface 70 of the clip to hence mount the faucet assembly in a manner described above. Demounting the faucet assembly is performed by reversal of the steps noted above using the tool 68 to urge the clip upwardly which then may be withdrawn from the groove 66.

It will also be appreciated from the above description that the provision of a plurality of grooves 66 permits the spring to be compressed to varying degrees to accommodate counters of varying thicknesses or to vary the force with which the valve and escutcheon are urged to their operable position. Accordingly, it will be appreciated that the quick-release system of the present invention isolates the area on which operations are performed from the region in the immediate vicinity of the bottom surface of the counter. Therefore, installation may be performed quickly and easily without working in the confined area. Further, the system of the invention is adaptable to particular applications by varying the number of grooves provided or by varying the length of the stem 42.

Therefore, although a specific embodiment of the present invention has been described above in detail, it is to be understood that it is for purposes of illustration. Modifications may be made to the described structure in order to adapt this quick-release system for particular faucet assembly installation applications.

What is claimed is:

1. A quick-release system for mounting and demounting a faucet assembly on a wall structure having an opening therein, said assembly including a valve positionable on and operable from one side of said wall structure adjacent said opening and being connected to a source of fluid located on the other side of said wall structure; said system comprising:

an escutcheon mounted in fixed relation with said valve to be located on said one side of said wall structure, said escutcheon being configured to prevent passage of it and, therefore, said valve through said opening;

an elongate, sustantially inextensible, tubular stem, secured at one end in fixed relation to said valve and said escutcheon and providing fluid communication between said valve and said source of fluid, said stem being configured to extend through said opening with its free end, opposite said one end, spaced from said other side of said wall structure;

washer means engagable against said other side of said wall structure and configured to prevent its passage through said opening;

retainer means, generally radially mountable on and generally radially demountable from said stem in a fixed axial position relative thereto intermediate said free end and said other side of said wall structure;

platform means secured to said stem forming a shoulder that projects generally radially from the axis of said stem and faces toward said one end of said stem;

spring means compressible between said retainer means and said washer means to urge said washer means to engage said other side of said wall structure thereby confining said wall structure between said escutcheon and said washer means to hold the valve in its operable position; and spring lifter means supportable on said shoulder for compressing said spring means against said other side of said wall structure sufficiently to permit mounting of said retainer means on said stem and demounting of said retainer means from said stem.

2. The system claimed in claim 1 wherein said stem is formed with at least one annular groove intermediate said free end and said one end and wherein said retaining means comprises:

a retainer clip shaped and sized to be radially received in and removed from said groove, said clip thereby embracing said stem and defining a reaction surface projecting generally radially from the axis of said stem.

3. The system claimed in claim 2 wherein said retainer clip is formed with tab means which may be grasped to insert and remove said clip into and from said groove.

4. The system claimed in claim 1 wherein said washer means comprises:
a washer receivable in loose coaxial relation about said stem, having a major outside dimension larger than an inside dimension of the opening whereby at least a portion of said washer abuts at least a portion of the surface of the other side of the wall structure adjacent the periphery of the opening when urged theretoward by said spring means.

5. The system claimed in claim 4 wherein said washer comprises:
a resilient washer section adapted to abut the portion of the other side of the wall structure; and
a top cap, attached to said spring means, that supports said resilient washer section.

6. The system claimed in claim 4 wherein said opening is circular and wherein said washer has a frusto-conical outer surface having a minimum radial dimension smaller than and a maximum radial dimension larger than the radius of the opening whereby said washer seats substantially coaxially in the opening when urged to engage the other side of the wall structure.

7. The system as claimed in claim 1 wherein said spring means comprises:
a coil spring receivable in loose coaxial relation about said stem.

8. The system as claimed in claim 7 further comprising:
a base cap attached to the end of said spring opposite that which engages said washer means and having a radially extending surface adapted to abut said retaining means when said spring is compressed.

9. The system claimed in claim 1 wherein said spring lifter means comprises:
a lever having a bifurcated end comprising two tines separated by a distance greater than the diameter of said stem but less than the diametric dimension of said shoulder.

10. The system claimed in claim 1 wherein said stem is formed with a plurality of annular grooves spaced axially apart and located intermediate said free end and said one end and wherein said retaining means comprises:
a retainer clip shaped and sized to be radially received in and removed from any one of said grooves, said clip thereby embracing said stem and defining a reaction surface projecting generally radially from the axis of said stem whereby the compressive force exerted by said spring means may be varied by selectively receiving said retaining clip in different ones of said grooves.

11. A quick-release system for mounting and demounting a faucet assembly on a wall structure having an opening therein, said assembly including a valve positionable on and operable from one side of said wall structure adjacent said opening and being connected to a source of fluid located on the other side of said wall structure; said system comprising:
an escutcheon mounted in fixed relation with said valve on said one side of said wall structure, said escutcheon being configured to prevent passage of it and, therefore, said valve through said opening;
an elongate, substantially inextensible, tubular stem secured at one end in fixed relation to said valve and said escutcheon and providing fluid communication between said valve and said source of fluid, said stem being configured to extend through said opening with its free end, opposite said one end, spaced from the other side of said wall structure, said stem being formed with at least one annular groove intermediate said free end and said one end;
a washer receivable in loose coaxial relation about said stem, matable in abutting relation with the surface of said other side of the wall structure adjacent said opening;
a generally U-shaped spring retainer clip sized to be generally radially mounted and generally radially demounted from said groove, defining a reaction surface projecting generally radially from the axis of said stem;
platform means secured to said stem forming a shoulder that projects generally radially from the axis of said stem and faces toward said one end of said stem;
a helically coiled spring also received in loose coaxial relation about said stem and being compressible between said reaction surface and said washer to thereby confine said wall structure between said escutcheon and said washer and firmly hold the valve in its operable position; and
a lever having a bifurcated end comprising two tines separated by a distance greater than the diameter of said stem but less than the diametric dimension of said shoulder, said lever being supportable on said shoulder and operable to compress said spring against said other side of said wall structure to permit mounting of said clip on said stem.

12. The system as claimed in claim 11 wherein said washer comprises:
a resilient washer section which abuts the portion of the other side of the wall structure; and
a top cap attached to said spring which supports said resilient washer section.

13. The system claimed in claim 12 wherein said opening is circular and wherein said washer has a frusto-conical outer surface having a minimum radial dimension smaller than and a maximum radial dimension larger than the radius of the opening whereby said washer seats substantially coaxially in the opening when urged to engage with the other side of the wall structure.

14. The system as claimed in claim 11 further comprising:
a base cap attached to the end of said spring opposite that which engages said washer means and having a radially extending surface adapted to abut said retaining means when said spring is compressed.

15. The system claimed in claim 11 wherein said retainer clip is formed by tab means by which it may be grasped for insertion and removable of said clip into and from said groove.

16. The system claimed in claim 11 wherein said stem is formed with a plurality of annular grooves spaced axially apart, intermediate said free end and said one end wherein the compressive force exerted by said spring may be varied by receiving said retaining clip in different ones of said grooves.

17. A quick-release system for mounting and demounting a faucet assembly on a wall structure having an opening therein, said assembly including a valve positionable on and operable from one side of said wall structure adjacent said opening and being connected to a source of fluid located on the other side of said wall structure; said system comprising:
- an escutcheon mounted in fixed relation with said valve to be located on said one side of said wall structure, said escutcheon being configured to prevent passage of it and, therefore, said valve through said opening;
- an elongate, substantially extensible, tubular stem, secured at one end in fixed relation to said valve and said escutcheon and providing fluid communication between said valve and said source of fluid, said stem being configured to extend through said opening with its free end, opposite said one end, spaced from said other side of said wall structure;
- retainer means, generally radially mountable on and generally radially demountable from said stem in a fixed axial position relative thereto intermediate said free end and said other side of said wall structure;
- spring means compressible between said retainer means and said other side of said wall structure; and
- a washer receivable in loose coaxial relation about said stem including a resilient washer section adapted to abut at least a portion of the surface of said other side of said wall structure adjacent the periphery of said opening, and a top cap, attached to said spring means, that supports said resilient washer section, whereby said spring means may urge said washer into abutting relation with said portion of said other side of said wall structure as aforesaid, thereby confining said wall structure between said escutcheon and said washer to hold the valve in its operable position.

18. A quick-release system for mounting and demounting a faucet assembly on a wall structure having an opening therein, said assembly including a valve positionable on and operable from one side of said wall structure adjacent said opening and being connected to a source of fluid located on the other side of said wall structure; said system comprising:
- an escutcheon mounted in fixed relation with said valve on said one side of said wall structure, said escutcheon being configured to prevent passage of it and, therefore, said valve through said opening;
- an elongate, substantially inextensible, tubular stem secured at one end in fixed relation to said valve and said escutcheon and providing fluid communication between said valve and said source of fluid, said stem being configured to extend through said opening with its free end, opposite said one end, spaced from said other side of said wall structure, said stem being formed with at least one annular groove intermediate said free end and said one end;
- a helical coil spring receivable in loose coaxial relation about said stem having an axial dimension in its relaxed condition greater than the distance from said groove to the other side of said wall structure;
- a generally U-shaped spring retainer clip sized to be generally radially mounted on and generally radially demounted from said groove, defining a reaction surface projecting generally radially from the axis of said stem; and
- a washer receivable in loose coaxial relation about said stem and including a resilient washer section that abuts at least a portion of said other side of said wall structure, and a top cap attached to said spring that supports said resilient washer section, whereby said spring is compressible between said reaction surface and said washer to thereby confine said wall structure between said escutcheon and said washer and firmly hold the valve in its operable position.

* * * * *